United States Patent
Padiyath et al.

(10) Patent No.: US 8,574,666 B2
(45) Date of Patent: Nov. 5, 2013

(54) METHOD OF IMPARTING CORROSION RESISTANCE TO A MULTI-LAYER WINDOW FILM HAVING A METAL LAYER

(75) Inventors: Raghunath Padiyath, Woodbury, MN (US); Josh D. Tibbits, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1386 days.

(21) Appl. No.: 11/614,627

(22) Filed: Dec. 21, 2006

(65) Prior Publication Data

US 2008/0152931 A1 Jun. 26, 2008

(51) Int. Cl.
*B05D 5/06* (2006.01)

(52) U.S. Cl.
USPC ........... 427/162; 428/456; 428/623; 428/626; 428/629; 428/457

(58) Field of Classification Search
USPC .......... 427/162; 428/458, 623, 626, 629, 457; 252/387, 396, 395, 390
See application file for complete search history.

(56) References Cited

U.S. PATENT DOCUMENTS

| | | | | |
|---|---|---|---|---|
| 4,359,543 A | * | 11/1982 | Hegedus et al. | 523/177 |
| 4,411,964 A | * | 10/1983 | Hara et al. | 428/626 |
| 4,565,719 A | | 1/1986 | Phillips et al. | |
| 4,634,637 A | | 1/1987 | Oliver | |
| 4,645,714 A | * | 2/1987 | Roche et al. | 428/458 |
| 4,873,139 A | | 10/1989 | Kinosky | |
| 5,008,153 A | | 4/1991 | Hayes | |
| 5,506,059 A | | 4/1996 | Robbins et al. | |
| 5,925,453 A | | 7/1999 | Kase et al. | |
| 5,956,175 A | | 9/1999 | Hojnowski | |
| 6,007,901 A | | 12/1999 | Maschwitz et al. | |
| 6,030,671 A | | 2/2000 | Yang et al. | |
| 6,090,451 A | | 7/2000 | Barth et al. | |
| 6,294,233 B1 | | 9/2001 | Barth et al. | |
| 6,497,777 B1 | | 12/2002 | Huang | |
| 2005/0150425 A1 | * | 7/2005 | Gallagher et al. | 106/33 |
| 2005/0194086 A1 | | 9/2005 | Abate et al. | |
| 2006/0005483 A1 | * | 1/2006 | Barth et al. | 52/204.5 |

FOREIGN PATENT DOCUMENTS

WO WO 2005/095097 A1 10/2005

* cited by examiner

*Primary Examiner* — Nadine G Norton
*Assistant Examiner* — Mahmoud Dahimene
(74) *Attorney, Agent, or Firm* — Jeffrey M. Olofson

(57) ABSTRACT

A method of imparting corrosion resistance to an edge of a multilayer window film having a metal layer arranged between a pair of polymeric layers includes the step of treating the edge of the window film with a corrosion inhibitor.

13 Claims, 2 Drawing Sheets

METHOD OF IMPARTING CORROSION RESISTANCE TO A MULTI-LAYER WINDOW FILM HAVING A METAL LAYER

BACKGROUND

The present invention relates generally to window films including a metal layer and, more particularly, to a method of imparting corrosion resistance to the edge of such window films.

Window films are commonly used in commercial buildings, residential homes, and in automotive applications to save energy, improve comfort, provide UV protection, prevent the leakage of high frequency communications signals from the structure, and help reduce the dangers associated with window breakage. Such window films are commercially available from 3M Company, St. Paul, Minn., under the Scotchtint window film product designation.

Such window films may include a metal layer, such as a vapor deposited layer of silver. High conductivity of the metal layer is desirable where the window film is to be used to prevent leakage of high frequency (e.g. 100 MHz-6 GHz) communication signals from the structure. In order to achieve a window film having the best combination of high conductivity, high transmission and high reflection, it is desirable to use pure silver for the metal layer.

Silver layers are highly prone to corrosion in the presence of atmospheric elements such as water and chlorine, particularly along the edges of the window film. That is, even through the layer of silver of a window film may be protected by a coating or a laminated film, the silver layer will be exposed to the corrosive elements of the surrounding environment along its edges. The corrosion process is accelerated with increased ambient temperature in the presence of salt and moisture. Corrosion is aesthetically undesirable and also interferes with the performance of the window film. To protect it from corrosion, the silver layer is often alloyed or sandwiched between layers of other metals, such as copper or gold. These corrosion protection methods, however, add cost to the window film, alter the appearance and optical transmission of the window film, and decrease the conductivity of the metal layer.

In many instances, a window film having low reflection in the visible part of the solar spectrum (400-800 nm) is desirable while maintaining a high degree of reflection in the near IR range (800 nm-2500 nm). Multi-layer window film constructions having a dielectric/metal/dielectric in an A/B/A/B . . . type sequence may be made by tailoring the thickness of the individual layers such that the reflection in the visible range is suppressed. Such films are described in, for example, U.S. Pat. Nos. 6,007,901 (Maschwitz, et al.) and 6,391,400 (Russell, et al.).

U.S. Pat. No. 4,645,714 (Roche) discloses durable, secularly reflective mirrors for solar reflectors or fluorescent lamp fixtures that are formed by vapour-depositing silver on a polyester film and protectively covering it with a coating of transparent acrylate polymer containing a silver corrosion inhibitor such as glycol dimercaptoacetate.

U.S. Pat. No. 6,090,451 (Barth et al.) discloses edge sealing a window film by moving a porous applicator tip saturated with liquid sealant in wiping contact along an edge of the window film to be sealed so as to transfer a portion of the liquid sealant from the saturated applicator tip to the window film edge.

U.S. Pat. No. 6,294,233 (Barth et al.) discloses transparent edge sealed window films. The edges of the window film are preferably sealed by a liquid solvated polymer material which, upon curing, provides a solid transparent seal which significantly minimizes the degradative effects of the ambient environment.

The need exists for a corrosion resistant window film and, more particularly, for a simple, inexpensive, and effective method of imparting corrosion resistance to an exposed edge portion of a metal layer, such as silver, of a multilayer window film, including existing window films that are commercially available.

SUMMARY

The present invention generally provides a method of improving the corrosion resistance of a window film having a metal layer by treating the window film with a corrosion inhibitor(s) for a prescribed period of time sufficient to impart improved corrosion resistance to the window film. More specifically, the present invention relates generally to a method of improving the corrosion resistance along the edge of such window films. The edge of the window film may be treated after it has been mounted on a glass substrate by treating it with a dilute solution of corrosion inhibitor(s), or the edge of the window film may be treated with a dilute solution of corrosion inhibitors for a prescribed period of time to impart improved corrosion resistance before the window film is mounted on the glass substrate.

The present invention provides a method of imparting corrosion resistance to an edge of a multilayer window film including a metal layer, which may comprise, for example, silver, arranged between a pair of polymeric layers by treating the edge of the window film with a corrosion inhibitor. The window film may be treated by soaking the exposed metal edge surface of the metal layer in a liquid solution containing the corrosion inhibitor. The concentration of the corrosion inhibitor generally ranges from about 0.0005% by weight corrosion inhibitor to no greater than about 5% by weight. In a specific embodiment, the corrosion inhibitor may be provided as a solution of corrosion inhibitor or ethyl acetate.

In a more specific aspect, the corrosion inhibitor may be selected from the group consisting of 1-octaddecane thiol (ODT), trimethylol propane tris(3-mercapto propionate) (TMP), 5-methyl-1H-benotriazole (MBT), pentaerythritol tetrakis(3-mercapto propionate) (PTT) and glycol dimercaptoacetate (GDA).

In accordance with another aspect of the invention, the window film is exposed to the corrosion inhibitor for a relatively short, fixed period of time. The corrosion inhibitor is not an integral part of the window film construction. In one embodiment, the edge of the window film is treated with the corrosion inhibitor for at least about 1 minute and no greater than about 120 minutes.

In another embodiment, the window film is treated by applying a paste containing the corrosion inhibitor to the exposed edge surface of the material layer. The paste may be a mixture of a corrosion inhibitor in a crosslinked polyacrylic acid powder neutralized with triethanol amine. In one embodiment, the paste includes at least about 0.5% by weight corrosion inhibitor. In another embodiment, the corrosion inhibitor is glycol dimercaptoacetate (GDA). In a specific embodiment, the crosslinked polyacrylic acid powder is CARBOPOL EZ-1.

After treating the window film with the corrosion inhibitor, the treated portion of the window film may be rinsed with water, such as deionized water.

In another aspect, the invention provides a window film including a metal layer having an exposed edge that has been treated with a corrosion inhibitor.

An advantage of the present invention is that is provides a window film having a metal layer—which would otherwise be prone to corrosion—with corrosion resistance. Other advantages include that it provides a quick, easy, and inexpensive way of improving the corrosion resistance of an exposed edge of a metal layer in a multilayer window film construction, and that it provides improved silver corrosion resistance, which improves the lifetime of window films containing silver layers. The improved corrosion resistance may also eliminate the need for edge sealing of the window film which is difficult and messy. The invention also allows existing commercially available window films to be treated to improve their corrosion resistance without incorporating a corrosion inhibitor into the structure of the window film itself. In addition, the use of the corrosion inhibitor for imparting corrosion resistance to the window film does not interfere with the performance of the window film.

BRIEF DESCRIPTION OF THE DRAWINGS

The present invention will be further described with reference to the accompanying drawings, in which.

DETAILED DESCRIPTION

As used in this specification and the appended claims, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

The term "polymer" or "polymeric" will be understood to include polymers, copolymers (e.g., polymers formed using two or more different monomers), oligomers and combinations thereof, as well as polymers, oligomers, or copolymers that can be formed in a miscible blend.

Figure 1:
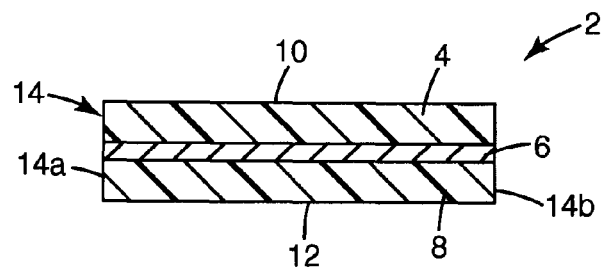
FIG. 1 is an enlarged cross sectional view of a simple form of a window film according to the invention.

Referring now to the drawings, FIG. 1 shows a multilayer window film composite 2 for selectively filtering the passage of electromagnetic waves through a window. The window film 2 includes a polymeric substrate layer 4 and a metal layer 6 arranged on one major surface of the substrate layer 4. In one embodiment, the metal layer 6 may include, for example, silver. A polymeric protective cover layer 8 is arranged adjacent the metal layer 6. In this manner, the metal layer 6 is sandwiched between the substrate layer 4 and the protective cover layer 8. The window film 2 includes opposed first 10 and second 12 major surfaces, and a peripheral edge surface 14. The peripheral edge surface includes left 14*a* and right 14*b* sides edges as well as front and rear edges (not shown). Because the metal 6 is exposed to atmospheric conditions along the peripheral edge surface 14 of the window film 2, it is along the edge 14 that the window film 2 is most likely to experience corrosion.

In accordance with one aspect of the invention, it has been discovered that the degree of corrosion along the edge 14 of the window film 2, in which the metal layer 6 is exposed to ambient conditions, can be suppressed or reduced significantly by treating at least the edge of the window film 2 with a corrosion inhibiting material for a period of time sufficient to produce a corrosion resistant effect.

As used herein, the term "treating" generally refers to a surface treatment. That is, the invention generally refers to treating the surface of the edge of the window film with the corrosion inhibiting material and does not involve incorporating the corrosion inhibiting material into the structure of the window film. Stated another way, the method according to the invention generally involves the topical surface treatment of the window film with a corrosion inhibiting material. The method does not generally involve integrating the corrosion inhibiting material into the window film construction. Treating the window film may include applying, exposing or otherwise contacting at least the edge of the window film with the corrosion inhibiting material.

This may be accomplished by, for example, spraying the edge, soaking the edge, or otherwise applying the corrosion inhibiting material to the edge portion of the window film. The treatment may be completed during the manufacturing of the window film or after the window film has been produced. The window film may also be treated before it has been applied to a substrate, such a window, or after the window film has been applied to a substrate. It will also be understood that the present invention may be used to treat existing commercially available window films—one which would otherwise exhibit corrosive edge behavior—thereby to render the edges corrosion resistant.

In accordance with one aspect of the invention, treating the edge of the window film involves soaking the edge surface 14—which includes the exposed metal layer—in a liquid solution containing the corrosion inhibiting material.

Suitable corrosion inhibiting materials include mercaptoacetic acid, 3-mercaptopropionic acid, 11-mercaptoundecylic acid, thiophenol, diphenyl disulfide, N-(2-hydroxyethyl)mercaptoacetamide, 2,2'-dimercaptodiethyl ether, 2,2'-dimercapto diethyl thioether, 1,2-ethanedithiol, and 3-mercaptoprpyl trimethoxysilane, glycol bis(3-mercaptopropionate), trimethylolpropane tris(3-mercaptopropionate), octadecyl mercaptan, dicetyl disulfide, octadecyl thioglycolate, 1-octaddecance thiol (ODT), trimethylol propane tris(3-mercapto propionate) (TMP), 5-methyl-1H-benotriazole (MBT), pentaerythritol tetrakis(3-mercapto propionate) (PTT) and glycol dimercaptoacetate (GDA).

The corrosion inhibiting material is typically provided in the form of a mixture. The mixture may be, for example, a dispersion, a solution or a paste. A particularly suitable form of the corrosion inhibitor is a liquid solution of the corrosion inhibiting material in ethyl acetate.

Depending on the particular corrosion inhibiting material used and depending on the length of time the window film edge is exposed to the corrosion inhibitor, the concentration of the corrosion inhibiting material in the mixture typically ranges from at least about 0.0001%, more typically at least about 0.0005%, even typically at least about 0.001%, even more typically at least about 0.01%, and even more typically at least about 0.05% by weight, to no greater than about 5%, more typically no greater than about 1%, and even more typically no greater than about 0.5% by weight of corrosion inhibiting material.

Depending on the particular corrosion inhibiting material used and depending on the strength (i.e. concentration) of the corrosion inhibiting material, the edge of the window film is typically treated with the corrosion inhibitor for at least about 1 minute, more typically at least about 3 minutes, and even more typically at least about 5 minutes, and typically no greater than about 120, more typically, no greater than about 60 minutes, even more typically no greater than about 30 minutes, and even more typically, no greater than about 20 minutes.

The corrosion inhibiting material may also be provided in the form of a paste that is applied to the exposed metal edge surface of the metal layer. The paste may be, for example, a mixture of a corrosion inhibiting material in a crosslinked polyacrylic acid powder neutralized with triethanol amine. A suitable paste typically includes at least about 0.5% by weight, and more typically at least about 1.0% by weight, corrosion inhibitor. A suitable corrosion inhibiting material for use in the paste is glycol dimercaptoacetate (GDA). A suitable crosslinked polyacrylic acid powder is available under the trade designation CARBOPOL EZ-1, from B.F. Goodrich Specialty Chemicals, Cleveland, Ohio. CARBOPOL EZ-1 is a crosslinked polyacrylic acid powder having a molecular weight of about 4,000,000.

After treating the edge of the window film with the corrosion inhibitor, the treated edge may optionally be rinsed with water, such as deionized water.

Figure 2:
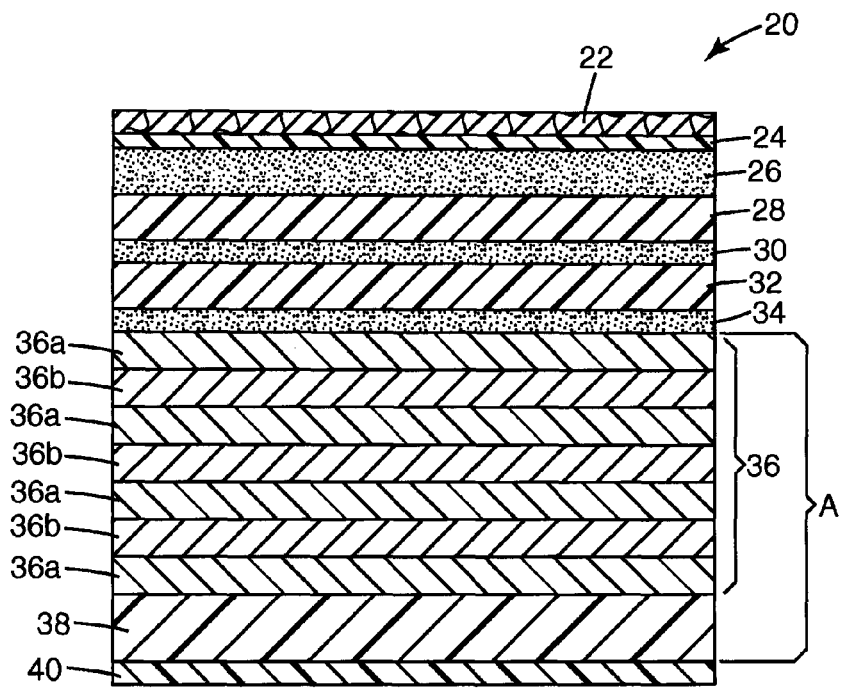
FIG. 2 is an enlarged cross sectional view of an alternate embodiment of the invention.

Referring now to FIG. 2, there is shown an alternate window film 20 that can be treated with a corrosion inhibitor to impart corrosion resistance to the edge of the window film. A window film having the construction shown in FIG. 2 is available from 3M Company under the name 3M CI 100B film.

The window film 20 includes a release liner 22 arranged over an optional overcoat 24. Adjacent the overcoat 24 is a layer of mounting pressure-sensitive adhesive (PSA) 26 that serves to adhesively bond the window film 20 to a surface, such as a window. The liner 22 may be, for example, a layer of one mil polyethylene terephthalate (PET). The liner 22 is provided to protect the PSA layer 26 during storage and handling of the window film 2 prior to applying the window film 2 to a surface, and is removed prior to installation to expose the PSA layer 26.

Adjacent the layer of mounting adhesive 26 is a first polymeric film layer 28, a first layer of laminating adhesive 30, a second polymeric film layer 32, and a second layer of laminating adhesive 34, respectively. The first and second polymeric film layers 28, 32 are typically tear resistant films. The first and second polymeric film layers 28, 32 may be the same or different films. Suitable films include polyvinyl butyral (PVB) films and the films described in U.S. Pat. No. 5,427,842 (Bland et al.) and U.S. Pat. No. 5,604,019 (Bland et al.), which are incorporated herein by reference. Particular films suitable for the first and second tear resistant polymeric film layers 28, 32 are SCLL400 film and 2 mil SCLL150 film, respectively, available from 3M Company, St. Paul, Minn.

Adjacent the second layer of laminating adhesive 34 is a metal layer 36 comprising a series of alternating layers of indium (III) oxide (InO) 36a and silver (Ag) 36b. Indium tin oxide (ITO) may be used in place of the InO. Adjacent the metal layer 36 is a polymeric substrate layer 38. The substrate layer 38 may be, for example, a two (2) mil layer of polyethylene terephthalate (PET). The combination of the metal layer 36 and the substrate layer 38, which are designated by the letter "A" in FIG. 2, define a filtering film for attenuating electromagnetic waves in the frequency range from 100 MHz to 6 GHz and 120 GHz to 40 THz. Suitable films are described in, for example, U.S. Pat. No. 4,613,530 (Hood et al.) and U.S. Pat. No. 4,799,745 (Meyer et al.), which are incorporated herein by reference. Suitable films include the EMI/RFI shielding films available from Southwall Technologies, Palo Alto, Calif. A particular film suitable for the filtering film "A" is XEM2.4 film available from Southwall Technologies.

An optional hard coat 40 is provided on the substrate layer 38 to provide the window film 20 with improved durability and scratch resistance. Suitable materials for the hardcoat include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

The layers of mounting adhesive layer 26 and laminating adhesive layers 30, 34 may be selected from conventional adhesives known to those skilled in the art. The adhesive layers may include additives such as UV absorbers or other optional ingredients.

In order that the invention described herein can be more fully understood, the following examples are set forth. It should be understood that these examples are for illustrative purposes only, and are not to be construed as limiting this invention in any manner.

EXAMPLES

Example 1

A window film similar to the one shown and described in reference to FIG. 2 was mounted on an ⅛ inch glass substrate. A small portion of the glass pane was dipped into a 0.05% by weight of glycol dimercaptoacetate in ethyl acetate solution for 30 minutes. The treated edges were then washed with running deionized water. The sample was placed in a salt fog chamber maintained and operated according to ASTM G85-02. The sample was taken out after 3 days in the salt fog chamber and examined for evidence of edge corrosion. The treated edges were found to show significantly less corrosion compared to the untreated edges. It was also observed that the non-corroded edge went beyond the line of contact with the corrosion inhibitor solution. This was attributed to a wicking effect.

Example 2

Figure 3:
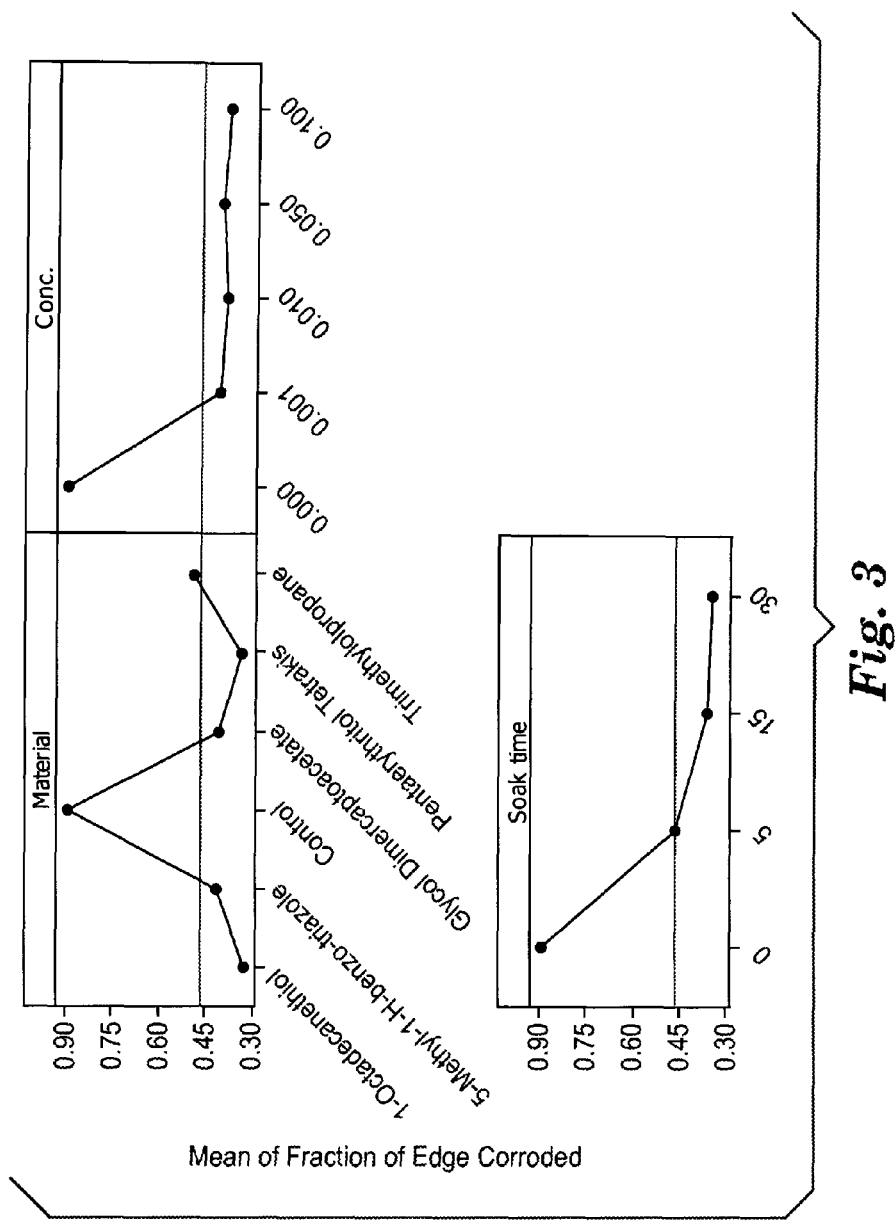
FIG. 3 is a graphical representation of the data from Example 2.

Five corrosion inhibiting material were tested for their effectiveness in reducing edge corrosion of a window film similar to the one shown and described in reference to FIG. 2. The corrosion inhibiting materials were: 1-octaddecane thiol (ODT), trimethylol propane tris(3-mercapto propionate) (TMP), 5-methyl-1H-benotriazole (MBT), pentaerythritol tetrakis(3-mercapto propionate) (PTT), and glycol dimercaptoacetate (GDA). These five materials were dissolved in ethyl acetate at 0.001%, 0.01%, 0.05% and 0.1% by weight, ¼"×6½" strips of the window film were cut and soaked in the above solutions for 5 minutes, 15 minutes and 30 min. The treated strips along with untreated strips of the same size were mounted on ⅛" glass panes. The glass panes were placed in a salt fog chamber and maintained according to ASTM G85-02. The samples were left in the salt fog chamber for at 24 hours (unless specifically indicated otherwise). The samples were then taken out and the % of edge length corroded recorded. The data was analyzed and the results are plotted in FIG. 3. The result indicate that even a relatively low concentration of corrosion inhibitor (e.g. 0.001% by weight) reduces the edge corrosion significantly. A soak time of 15 minutes or greater was found to be desirable.

Example 3

A paste of CARBOPOL EZ-1 neutralized with triethanol amine containing 0.01%, 0.1% and 1% by weight of GDA was made and applied to the edge of the window film shown in FIG. 2 mounted on glass. The paste was allowed to dry overnight and was then rinsed off with water. The samples were then placed in a salt fog chamber according to ASTM G85-02 for 24 hours, and corrosion level was measured. At the 0.01% and 0.1% GDA concentration levels, the improvement in corrosion resistance was noticeable but not as significant as expected. The paste containing 1% GDA did not appear to change the length of the corroded edge compared with the control not containing any GDA, but the ingress of corrosion was less in the sample treated with paste containing GDA. The results are shown below as a comparison in area corroded.

| Sample | Area corroded (mm$^2$) |
|---|---|
| Paste with no GDA | 213 |
| Paste containing 1% GDA | 26 |

Persons of ordinary skill in the art may appreciate that various changes and modifications may be made to the invention described above without deviating from the inventive concept. Thus, the scope of the present invention should not be limited to the structures described in this application, but only be the structures described by the language of the claims and the equivalents of those structures.

What is claimed is:

1. A method of imparting corrosion resistance to an edge of a multilayer window film construction comprising a metal layer arranged between a pair of polymeric layers, the method comprising the step of treating the edge of the window film with a corrosion inhibitor, wherein the corrosion inhibitor is selected from the group consisting of 1-octaddecane thiol (ODT), trimethylol propane tris(3-mercapto propionate) (TMP), 5-methyl-1H-benotriazole (MBT), pentaerythritol tetrakis(3-mercapto propionate) (PTT) and glycol dimercaptoacetate (GDA).

2. A method of imparting corrosion resistance to a window film as defined in claim 1, wherein the step of treating the window film includes soaking the exposed edge surface of the metal layer in a liquid solution containing the corrosion inhibitor.

3. A method of imparting corrosion resistance to a window film as defined in claim 1, wherein the corrosion inhibitor includes at least about 0.0005% by weight corrosion inhibitor material, and no greater than about 5% by weight corrosion inhibitor material.

4. A method of imparting corrosion resistance to a window film as defined in claim 1, wherein the corrosion inhibitor is a solution of corrosion inhibitor material and ethyl acetate.

5. A method of imparting corrosion resistance to a window film as defined in claim 1, wherein the edge of the window film is treated with the corrosion inhibitor for at least about 1 minute and no greater than about 120 minutes.

6. A method of imparting corrosion resistance to a window film as defined in claim 1, wherein the step of treating the window film includes applying a paste containing the corrosion inhibitor to the exposed edge surface of the metal layer.

7. A method of imparting corrosion resistance to a window film as defined in claim 6, wherein the paste is a mixture of a corrosion inhibitor in a crosslinked polyacrylic acid powder neutralized with triethanol amine.

8. A method of imparting corrosion resistance to a window film as defined in claim 7, wherein the paste includes at least about 0.5% by weight corrosion inhibitor.

9. A method of imparting corrosion resistance to a window film as defined in claim 8, wherein the corrosion inhibitor is glycol dimercaptoacetate (GDA).

10. A method of imparting corrosion resistance to a window film as defined in claim 9, wherein the crosslinked polyacrylic acid powder has a molecular weight of about 4,000,000.

11. A method of imparting corrosion resistance to a window film as defined in claim 1, further comprising the step of rinsing the treated edge with water.

12. A method of imparting corrosion resistance to a window film as defined in claim 11, wherein the water is deionized water.

13. A method of imparting corrosion resistance to a window film as defined in claim 1, wherein the metal layer comprises silver.

* * * * *

UNITED STATES PATENT AND TRADEMARK OFFICE
CERTIFICATE OF CORRECTION

| | | |
|---|---|---|
| PATENT NO. | : 8,574,666 B2 | Page 1 of 1 |
| APPLICATION NO. | : 11/614627 | |
| DATED | : November 5, 2013 | |
| INVENTOR(S) | : Raghunath Padiyath et al. | |

It is certified that error appears in the above-identified patent and that said Letters Patent is hereby corrected as shown below:

In the Specification

Column 1
Line 29-30, Delete "even through" and insert -- even though --, therefor.
Line 53-54, Delete "secularly" and insert -- specularly --, therefor.

Column 2
Line 38, Delete "or" and insert -- and --, therefor.
Line 54, Delete "material" and insert -- metal --, therefor.
Line 65, Delete "the invention" and insert -- the present invention --, therefor.

Column 4
Line 26, Delete "one" and insert -- ones --, therefor.
Line 67, Delete "120," and insert -- 120 minutes, --, therefor.

Column 7
Line 30, Delete "be the" and insert -- by the --, therefor.

Signed and Sealed this
Tenth Day of March, 2015

Michelle K. Lee
*Deputy Director of the United States Patent and Trademark Office*